United States Patent [19]

Thomas

[11] 4,172,598

[45] Oct. 30, 1979

[54] SEALING METHODS

[75] Inventor: Desmond C. M. Thomas, Port Talbot, Wales

[73] Assignee: Goricon Metallurgical Services Limited, Glamorgan, Wales

[21] Appl. No.: 700,721

[22] Filed: Jun. 28, 1976

[51] Int. Cl.² .......................... B28B 19/00; B29F 5/20
[52] U.S. Cl. ........................................ 277/1; 264/261; 264/262; 264/267; 277/229; 156/71
[58] Field of Search .................. 264/30, 262, 313, 340, 264/333, 315, 261, 32, 60, 259, 267; 49/475, 477, 488, 498; 277/34.3, 34.6, DIG. 10, DIG. 11, 226, 227, 229, 235 R, 237, 1; 106/89, 97, 98, 73, 63, 64, 69, 71; 202/96, 215, 248; 432/250, 266, 237, 244; 34/242; 156/71

[56] References Cited

U.S. PATENT DOCUMENTS

| | | | |
|---|---|---|---|
| 1,143,411 | 6/1915 | Limberg | 202/248 |
| 1,987,120 | 1/1935 | Loomis | 277/229 |
| 2,040,887 | 5/1936 | Van Ackeren | 202/248 |
| 2,240,744 | 5/1941 | Arpin | 106/98 |
| 2,662,053 | 12/1953 | Brown | 202/248 |
| 2,664,838 | 1/1954 | Sorenson | 432/250 |
| 2,855,347 | 10/1958 | Cellan-Jones | 110/173 R |
| 2,900,265 | 8/1959 | Klein | 106/97 |
| 3,061,895 | 11/1962 | Kleinhans | 277/226 |
| 3,429,973 | 2/1969 | Carter et al. | 432/237 |
| 3,877,675 | 4/1975 | Shapland | 277/226 |
| 3,900,369 | 8/1975 | Irie et al. | 110/173 R |
| 3,904,213 | 9/1975 | Swanson et al. | 277/207 A |
| 3,909,010 | 9/1975 | Swanson et al. | 277/DIG. 2 |
| 3,923,311 | 12/1975 | Tashlick | 277/1 |

FOREIGN PATENT DOCUMENTS 1161109  8/1969  United Kingdom .

Primary Examiner—W. E. Hoag
Attorney, Agent, or Firm—A. W. Breiner

[57] ABSTRACT

Doors and other closure members for apertures of high temperature plant e.g. coke ovens, are sealed by a heat-resistant putty, conveniently a clay-based putty, applied in a tubular skin, e.g. of polyethylene. On closing the aperture the skin deforms and bursts to distribute the putty to the mating surfaces.

12 Claims, 4 Drawing Figures

SEALING METHODS

The present invention relates to sealing materials.

In accordance with the present invention, there is provided a method of sealing around a door or other movable closing member fitted to an aperture of an installation having a high operating temperature to prevent gaseous leakage between the mating surfaces of the movable member and the aperture which comprises inserting between the mating surfaces a high temperature putty provided in the form of at least one strip having an outer skin of coherent material.

The method is of special interest when applied to coke ovens for sealing around such closures as doors, coal hole closures and ascension pipe inspection doors. Its effect is to reduce gaseous leakage thereby leading to increased efficiency and/or reduced atmospheric pollution. It may also be applied to other firing installations for example in the ceramic, cement and glass industries. Bringing the mating surfaces together causes the skin to burst leaving the putty to spread between the surfaces.

Having an outer skin formed of coherent material renders the putty simple to transport, store and apply, as well as tending to extend the shelf-life thereof. Simple readily available materials may be employed for the outer skin, conveniently thin-walled polyethylene or polyvinyl chloride tubing of the kind produced by blowing techniques.

Whilst it is preferred to employ, as the coherent material, an impermeable material which retains moisture, a permeable material may be employed and soaked, with its content of putty, in water preparatory to use.

In many instances, the structure to which the closure is to be sealed is in a hot condition. Even so, a relatively low melting thermoplastic material such as polythene can still give good results, retaining its coherence sufficiently for the purpose if the operation is carried out quickly. In cases where the tenacity of a thermoplastic skin is insufficient, it may be covered with a temperature-resistant sheet material, eg. cotton or jute fabric.

A skin of non-thermoplastic material, eg. regenerated cellulose film of the kind known by the trade name Cellophane, may be employed for cases where a thermoplastic material is unsuitable.

Positioning the strip around the outside of a closure member having an outwardly directed face for mating with the face of the aperture gives a reasonably stable assembly without providing attachments to secure the strip temporarily to the closure member. Additionally, the closure member is in many practical cases, substantially cooler than the structure to which it is applied.

The tensile strength of the strip may be improved, if required, by incorporating a tension resistant member such as a wire or a cord formed from textile fibre within the skin. This arrangement improves the hot-handling properties of the material and can be advantageous when the material is applied in heavy suspended lengths. For application to circular closures, the strip material may be provided in annular form and, if desired, provided with an internal wire to hold it in its annular configuration.

The choice of a suitable putty depends upon factors which will be apparent to those skilled in the art. For some purposes a putty formed simply of clay and sufficient moisture to facilitate manipulation may be employed. In general it is preferred to formulate the composition from such materials as refractory powders, clays, cement and modifying agents such as detergents and materials which harden by hydration as described in British Patent specifications 1,161,109. Examples of suitable putties are as follows:

|  | Weight % Example 1 | Weight % Example 2 |
|---|---|---|
| Fireclay | 55.0 | 27.5% |
| Sand | 17.5 | 20.0% |
| Water | 21.5 | 22.0% |
| Portland Cement | 0.75 to 3.0 | — |
| Calcium Chloride $CaCl_2 \cdot 6H_2O$ | 1 to 5 | — |
| Detergent | — | 0.5% |

The sand, which is to be considered optional, reduces sticking and renders the sealing element friable after use so that it can easily be broken and brushed away when the mating surfaces are moved apart.

The two putties shown above are readily extruded and filled into the skin cf. sausage manufacture. The calcium chloride of Example 1 softens the mix and retards the hardening thereof and is particularly suitable for extruding to small diameters.

The following description in which reference is made to the accompanying drawing is given by way of illustration. In the drawing.

Figure 1:
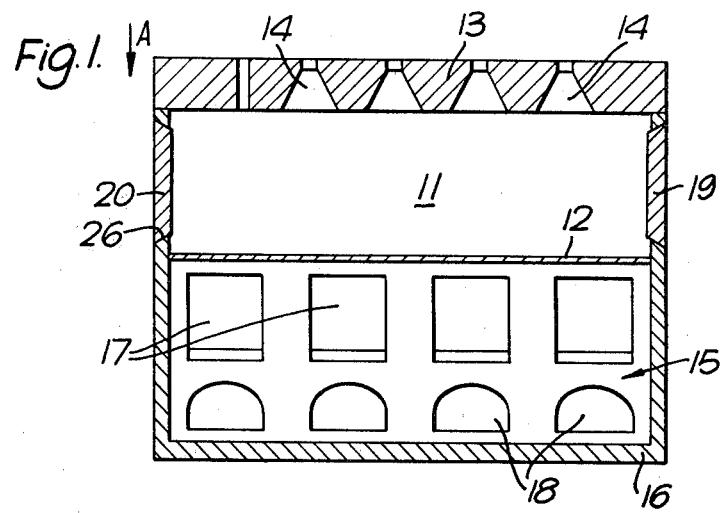
FIG. 1 shows a coke oven in vertical longitudinal cross section.

The coke oven of FIG. 1 is conventional. It has an oven chamber 11 with a floor 12 and a roof 13 formed with charging holes 14. Below the floor 12 is a structure 15 built on foundation 16 with checkers 17 and flues 18. Chamber 11 is closed by a pair of doors 19 and 20.

Figure 2:
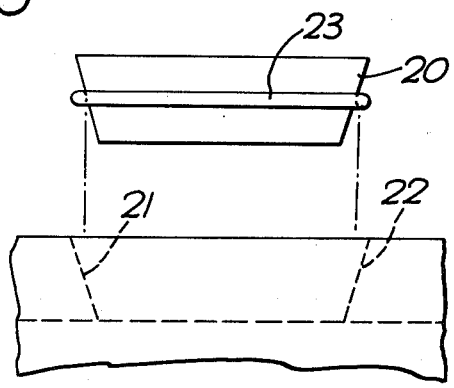
FIG. 2 is a plan of one end of the oven showing a door thereof open and with a strip of material according to the invention positioned thereon.

FIG. 2 is a plan showing door 20 opened as seen in the direction of arrow A in FIG. 1. The periphery of door 20 is tapered to fit the four complementary surfaces of the door jamb. The vertical surfaces are shown at 21 and 22. With the door open a thin-walled tube of polyethylene 23 filled with a putty 24 according to Example 1 or Example 2, and optionally reinforced tensionally with an internal wire or cord 25 (FIG. 4) is fitted across the top of, and around the sides and bottom 26 of the door. On closing the door, the tube 23 deforms, stretches and bursts to provide a filling of the putty between the door and the door jamb.

In use, the surfaces of the door jamb and the periphery of the door become uneven from corrosion and the deposition of tar and coke-like deposits so that a gas-tight mating fit of machined mating surfaces is difficult to maintain.

Figure 4:
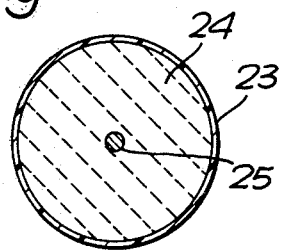
FIG. 4 shows the strip of material in cross section.
Figure 3:
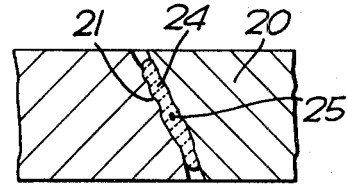
FIG. 3 is a cross section of part of the door and adjacent door-jamb after closing.

The spacing between the surfaces, and the thickness of the tube 23 are exaggerated in FIGS. 3 and 4 respectively for clarity of illustration.

It is to be understood that the examples, and the application of the invention described with reference to the drawing, are provided for purposes of illustration only and that various departures may be made therefrom by those skilled in the art, all within the spirit and scope of the invention.

What we claim is:

1. A method of sealing around a movable closure member fitted to an aperture of an installation having a high operating temperature to prevent gaseous leakage between the mating surfaces of the movable member and the aperture, which method comprises taking a sealing strip formed of a water-permeable cohernet tubular plastics film material rupturable in use, and a fire clay-based material, which is spreadable when moistened, contained within the plastics film, soaking the sealing strip in water thereby moistening the fire clay-based material, and inserting the soaked strip between the mating surfaces and rupturing said film between said surfaces.

2. The method according to claim 1 wherein the mating surfaces are substantially vertical.

3. A method according to claim 1 in which the installation is a coke oven.

4. A method according to claim 1 in which the closure member is a door.

5. A method according to claim 1 in which the film material is formed from tubing of a material selected from the group consisting of polyethylene and polyvinyl chloride.

6. A method according to claim 1 in which the fire clay-based material is formed of moist clay.

7. A method according to claim 1 in which the fire clay-based material is formed from clay and refractory powder and at least one additive selected from the group consisting of calcium chloride and detergents.

8. The method of claim 1 including spreading said fire clay-based material on said surfaces, thereby sealing spaces between said surfaces.

9. A method according to claim 8 in which at least a major proportion of said strip is located on said peripheral surface by tensile forces produced therein by gravitation.

10. A method according to claim 1 in which a tensile resistant member is incorporated within the fire clay-based material.

11. A method according to claim 10 in which said member is a wire.

12. A method according to claim 10 in which said member is a cord formed of textile fibres.

* * * * *

UNITED STATES PATENT AND TRADEMARK OFFICE
CERTIFICATE OF CORRECTION

PATENT NO. : 4,172,598
DATED : October 30, 1979
INVENTOR(S) : Desmond C. M. Thomas It is certified that error appears in the above-identified patent and that said Letters Patent are hereby corrected as shown below:

In the heading, add line [30] --Foreign Application Priority Data  July 1, 1975  United Kingdom 27657/75--;

Column 3, Claim 1, line 4, "cohernet" should read --coherent--.

Signed and Sealed this

Fourteenth Day of October 1980

[SEAL]

Attest:

SIDNEY A. DIAMOND

Attesting Officer    Commissioner of Patents and Trademarks